United States Patent [19]

Lindsley

[11] Patent Number: 4,465,789

[45] Date of Patent: Aug. 14, 1984

[54] HYDROTREATING CATALYST SUPPORT HAVING DUAL PORE STRUCTURE

[75] Inventor: John F. Lindsley, Stamford, Conn.

[73] Assignee: American Cyanamid Company, Stamford, Conn.

[21] Appl. No.: 481,701

[22] Filed: Apr. 4, 1983

[51] Int. Cl.³ .................... B01J 21/04; B01J 21/12; B01J 23/88
[52] U.S. Cl. ............................... 502/255; 502/254; 502/314; 502/527; 208/216 PP; 208/254 H
[58] Field of Search ............... 502/254, 255, 314, 527

[56] References Cited

U.S. PATENT DOCUMENTS 4,120,826 10/1978 Ebel et al. ..................... 502/314
4,255,253  3/1981 Herrington et al. ............ 502/524

*Primary Examiner*—W. J. Shine
*Attorney, Agent, or Firm*—Gordon L. Hart

[57] ABSTRACT

Hydrotreating catalysts are made on supports having a core of alumina having predominantly micropore structure, surrounded by a rind of different alumina having at least 25% of total pore volume in macropores. The catalyst support material is impregnated with catalytic metals, e.g. molybdenum with cobalt or nickel or both. The rind captures metals removed from the oils being treated to prevent deactivation of the core by such metals.

5 Claims, 3 Drawing Figures

HYDROTREATING CATALYST SUPPORT HAVING DUAL PORE STRUCTURE

The invention relates to improvements in alumina supported catalysts which are useful for hydrotreating oils such as petroleum distillation residues, oils derived from coal, and the like, for removal of sulfur and nitrogen compounds. The invention provides also for reremoval of metals found in the oils being treated.

For hydrotreating oils to remove sulfur and nitrogen, catalysts comprising a group VI B metal, usually molybdenum, with one or more of the group VIII metals, usually cobalt for hydrodesulfurization (HDS) or nickel for hydrodenitrogenation (HDN) or both, are used on supports comprising alumina. The porosity characteristics of the catalyst supports are important to the relative activity of these catalysts for the several catalytic functions. Catalysts on supports having a high proportion of their total pore volume in pores of diameters less than 100 Å (micropores) are preferred for the HDS and HDN reactions. The removal of metals from oils in a hydrotreating process, hydrometallation (HDM), occurs to some degree in most HDS or HDN treatment of residual oils, and HDM may be a specified object to improve the oil in some processes. The metals from the oil, e.g. vanadium, nickel, are deposited mostly in pores of the catalyst having diameters above 1000 Å (macropores). When an HDS or HDN catalyst is provided with only small proportions of pore volume in the large macropores, the HDS or HDN activity, or both may be initially high but may rapidly decay as access pores become clogged with metals removed from the oil.

My invention provides a core-and-rind catalyst made on supports having an inner core of the micropore type of alumina or silica alumina wanted for high activity in HDS or HDN processes and having a rind of a different alumina surrounding the core. The rind comprises alumina on alumina with silica of a kind having adequate pore volume in pores of diameters over 1000 Å to provide for capture in those macropores of metals removed from the oil through a long period of operation while still permitting access of the oil through the rind to the microporous core of the catalyst.

Figure 2:
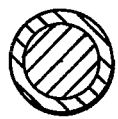
FIG. 2 is the top view of the outer surface of the spherical catalyst particle.
Figure 1:
FIG. 1 is a cross section of the spherical catalyst particle having core and rind structure.
Figure 3:
FIG. 3 is the side view of the outer surface of the spherical catalyst particle.

The core-and-rind structure of the invention is illustrated in the Drawing which represents a cross section through the center of a spherical catalyst particle having an inner core made with one support material and the outer rind made with another support material. The Drawing is not drawn to scale and the proportions of the relative diameters of the core and rind shown in the Drawing may not correspond to those of an actual catalyst embodying the invention. The inner core of the spherical catalyst will usually be of a diameter in the range from about 1/32 inch to about 1/10 inch. The rind thickness will usually be in the range from about 0.01 to about 0.03 inch.

The catalyst support material for making the inner core of the catalyst particles may be any suitable alumina or alumina and silica support material of the kind known in the art for making hydrotreating catalysts and which are characterized by a pore size distribution that will provide from about 70% to 100% of the total pore volume of the core material in micropores, i.e. pores having diameters less than 100 Å.

The catalyst support material for making the rind of the catalyst particle may be any suitable alumina or alumina and silica support material of kinds known in the art, which are characterized by pore size distribution that will provide from about 25% to about 60% of the total pore volume of the rind material in macropores, i.e. pores having diameters greater than 1000 Å.

The invention is readily accomplished by making spherical bead particles having the core-and-rind structure, but the invention may include catalyst particles of shapes other than the spherical shape, provided they have the essential core-and-rind structure.

The size of the core-and-rind particles may be of any size in the range suitable for hydrorefining, usually from about 1/32 in. diameter to about ⅛ inch diameter.

A catalyst bed of the core-and-rind particles can provide catalytic hydrometallation (HDM) in the same treatment which also provides one or both of the catalytic HDS and HDN functions. The rind functions mainly for the HDM treatment, capturing the metals and thereby protecting the core which is designed particularly for the HDS/HDN function. For hydrorefining a selected oil of a given composition, the core-and-rind structure and composition can be designed to provide optimum catalyst life and efficiency, as by adjusting proportions of the core and rind materials and combining the selected alumina and catalyst metal components in proportions that will particularly suit the proportions of sulfur, nitrogen and metal impurities found in the oil.

For making the core, one may use, for example alumina or silica alumina support materials, having predominant micropore volume of the kinds described in U.S. Pat. Nos. 4,102,821; 4,069,139; 3,531,398; 4,066,574; 4,181,602; 3,770,618; and the like.

For making the rind, we may use, for example alumina or silica-alumina support materials, having the relatively high macropore volume, of the kinds described in U.S. Pat. Nos. 4,102,942; 3,222,129; 4,166,100, 3,901,792; and the like.

In some preferred embodiments, the density of the rind may be reduced by incorporating combustible fillers in the support material. These fillers are removed by combustion during calcining of the catalyst leaving a coarse porous network within the rind which can provide better access to the core. The amount of combustible filler may be varied from about 10% to about 40% by wt. of the combined weight of alumina and filler, to adjust the density of the rind or to permit better access to the core.

Catalyst metals may be incorporated in the supports by addition of the catalyst metal precursor compounds to the alumina material during the process of forming the support materials into particles, or catalytic metals may be impregnated into the support particles after they have been formed. For making catalysts having controlled amounts of catalytic metals in each of the core and rind parts, we prefer to incorporate at least some parts of the catalytic metals during the particle formation. The catalytic metals to be supported on the core portion will be chosen to suit the HDS or HDN function, or both. For example, a core intended for the HDS or HDN function will typically comprise from about 10 to about 25% by wt. of molybdenum and from about 3 to about 15% by wt. of cobalt or nickel. Both cobalt and nickel may be used together for a combined HDS, HDN function. A rind intended mainly for demetallation may contain molybdenum alone without a group VIII metal, or the rind may include catalytic metals from both the group VI B and the group VIII metals. In some embodiments a core-and-rind catalyst may provide adequate demetallation by the rind without addition of catalytic metal in the rind portion.

The following detailed examples describe some preferred core-and-rind catalysts embodying the invention, and how they are made.

EXAMPLE 1

The alumina selected for making the core is gamma alumina ($Al_2O_3$) prepared by precipitation of alumina to form an alumina hydrogel. A water slurry of alumina hydrogel ($Al_2O_3$) and $MoO_3$ is spray dried to make a powder of 13% by wt. $MoO_3$, remainder $Al_2O_3$. A paste is made by mixing 4,540 g of this powder with 3,065 ml deionized water, 470 g $(CoNO_3)_2.6H_2O$, 29 ml 70% $HNO_3$ and 29 g of Superfloc 16 flocculant. The paste is mulled in a mixer-muller for 90 minutes and then extruded to make 1/32 inch or smaller cylindrical extrudate particles. The green extrudates are processed in an Elanco Marumerizer machine to form the extrudates into spherical beads of nominal 1/32 inch diameter. These beads are first dried and then calcined for one hour at 1000° F.

The alumina selected for the rind is rehydratable alunina prepared by flash-calcining alumina trihydrate such as bauxite ore concentrate. The rehydratable alumina contains a high proportion of rho alumina. A powder of this rehydratable alumina is placed in the tilted rotating pan of a pan granulator and is coated onto the calcined beads of the core material by the pan granulation technique. The beads are placed in the rotating pan with the alumina powder and water is sprayed into the pan to control the wetting and coating of the powder on the beads to form the rind as the pan continues to rotate. When a core-and-rind particle has been formed with about 75 wt.% of the rind alumina material, the beads are removed from the pan granulator to a closed steam bath and steamed for about 8–18 hours to rehydrate the rho alumina. The rehydrated beads are dried and then calcined at 1000° F. for about one hour.

To add molybdenum to the calcined core-and-rind beads, 430 ml of a dilute ammonium molybdate solution, containing molybdenum equivalent of 31.3 g $MoO_3$, is impregnated on 750 g of the calcined beads. The impregnated beads are dried and calcined at 1000° F. for one hour.

Analysis of the calcined core particles before the rind was formed showed 4% CoO and 12.5% $MoO_3$ by wt. in the core. Gross analysis of the finished core-and-rind beads shows the $MoO_3$ content is 6.7% and the CoO content is 0.8%.

The pore size distribution in the beaded core material provides a total pore volume about 0.48 ml/g with about 0.46 ml/g in micropores having pore diameters less than 1000 Å and only about 0.01 ml/g in pores of diameters over 1000 Å. The pore size distribution in the rind portion provides a total pore volume of about 0.9 ml/g with about 0.47 ml/g in pores of diameters over 1000 Å.

EXAMPLE 2

The core is prepared the same as in Example 1. The alumina for making the rind is the same rehydratable alumina powder used in Example 1. The rehydratable alumina powder is mixed with Avicel brand cellulose microparticles in a blender to give a mixture containing about 25% by wt of the Avicel material as a combustible filler. This mixture is coated on the core and finished the same as in Example 1. The cellulose is burned away during the calcination. The resulting core-and-rind catalyst has a less dense rind with higher macropore volume than those made without the combustible filler.

We claim:

1. Catalyst for hydrotreating of oils which contain metal contaminants, for catalytic hydrodesulfurization or hydrodenitrogenation of said oil and also for removal of at least some of the metal from the oil, said catalyst comprising at least one catalytic metal selected from group VIB and at least one catalytic metal selected from group VIII of the periodic table, the support for said catalytic metals comprising (1) a core of alumina or alumina and silica material having pore size distribution to provide at least about 70% of the total pore volume of said core material in pores having diameters less than 100 Å, and (2) a rind of alumina or alumina and silica material surrounding said core, said rind material having a pore size distribution to provide at least 25% of the total pore volume in pores having diameters greater than 1000 Å.

2. A catalyst defined by claim 1 wherein catalytic metals supported on the core material comprise molybdenum and at least one of nickel and cobalt, and catalytic metal supported on the rind material comprises molybdenum.

3. A catalyst defined by claim 1 wherein the core alumina material is gamma alumina and the rind alumina material is rehydrated alumina.

4. A catalyst defined by claim 1, wherein the core and rind support is spherical in shape.

5. A method of making a catalyst defined by claim 1 comprising the steps of:
   a. forming the core material into spherical particles containing at least part of the catalytic metals;
   b. coating the spherical core particles with rehydratable alumina powder in amount sufficient to form the rind, and
   c. rehydrating the rind material and calcining the core-and-rind particle.

* * * * *